Feb. 28, 1956 T. F. McCARTHY 2,736,420
AUTOMATIC COAL TRANSFER CONVEYOR
Filed Dec. 6, 1951 6 Sheets-Sheet 3

Inventor:
Timothy F. McCarthy
by Hill, Sherman, Meroni, Gross & Simpson Attys Feb. 28, 1956     T. F. McCARTHY     2,736,420
AUTOMATIC COAL TRANSFER CONVEYOR
Filed Dec. 6, 1951     6 Sheets-Sheet 6

Inventor:
Timothy F. McCarthy
by Hill, Sherman, Meroni, Gross & Simpson
Attys

United States Patent Office 2,736,420
Patented Feb. 28, 1956

2,736,420

AUTOMATIC COAL TRANSFER CONVEYOR

Timothy F. McCarthy, Indiana, Pa.

Application December 6, 1951, Serial No. 260,215

9 Claims. (Cl. 198—79)

This invention relates to improvements in conveyors and more particularly relates to an improved conveyor system particularly adapted for use in mines underground.

Heretofore, in the mining of coal and particularly where continuous cutting and loading machines are used to cut and load coal in a continuous operation without shooting, it has not been possible to maintain the cutting and loading machine in continuous operation to a point approaching an efficient operation of the machine due to the inability to transport the mined material away from the cutting and loading machine as fast as the machine cuts, breaks down and picks up the coal for loading. Many attempts have been made to increase the efficiency of such machines by speeding up the operation of transporting the mined coal away from the machine, particularly by the use of shuttle cars and the like, with some degree of success, but with the most efficient cutting and loading shuttle car systems in use today the use factor of the cutting and loading machine is only from 20% to 50% of its maximum capacity.

A principal object of my invention is to remedy these difficulties by providing a continuous material transportation apparatus and system which may be advanced with the continuous cutting and loading operation and which affords a continuous flow of mined coal from the working face of the mine and enables the working face to be continuously advanced without affecting the transportation system.

A further object of my invention is to provide a continuous transportation system for coal in mines underground in the form of a combination of room and cross conveyors arranged with a view toward utmost efficiency and flexibility in operation.

A still further object of my invention is to provide a novel and improved transportation system for mines underground including a room or transfer conveyor having means therein for lifting the load out of the conveyor and transferring it to a main gathering conveyor in a simple and efficient operation.

A further object of my invention is to provide a novel and improved conveying system for mines underground continuously taking coal from a cutting and loading machine and so arranged as to utilize a minimum amount of head room for the conveyor system and enable the room conveyor to be advanced without affecting the main gathering conveyor.

Still another object of my invention is to provide a novel and improved form of transportation system for coal in mines underground including an extensible room conveyor arranged to transport material to a main gathering conveyor and having a stationary transfer pan therein for lifting the conveying medium of the conveyor bodily out of the conveyor pan line and transferring the load to the main gathering conveyor in a simple and efficient operation.

Still another object of my invention is to provide a novel and improved form of chain conveyor for use in mines underground including an extensible conveyor pan line supported for advancing movement along a mine room and having a material transferring means nested therein for elevating the conveying medium and its load at a point intermediate the ends of the pan line and transferring to a main gathering conveyor.

Another and more detailed object of my invention is to provide a novel and improved form of chain conveyor for use in mines underground so arranged that one run of the conveyor will carry coal away from the working place and the other run of a conveyor may transport supplies such as mine props and the like up to the working face.

Still another and more detailed object of the invention is to provide a novel and improved conveyor system for mines underground including an extensible pan line mounted on the ground for advancing movement therealong, a chain traveling along said pan line and conveying coal therealong and a transfer pan forming an elevating continuation of the pan line and lifting the chain and load out of the pan line for discharging the load onto a cross conveyor and out of the pan line for transfer onto a main conveyor, and so arranged as to utilize a minimum amount of head room, and affording a means for accommodating the room conveyor to be advanced without affecting the main gathering conveyor or the transfer of material thereinto.

Still another object of my invention is to provide a novel and improved conveyor system for mines consisting in a room conveyor of the belt type together with means for unloading the belt intermediate its ends for discharge into a main conveyor or the like.

Still another object of my invention is to provide a novel and improved form of belt room conveyor having means intermediate its ends for elevating the conveyor above the conveyor line at various desired points along the length thereof, and having a shaking transfer pan transferring the load from the belt, for discharge onto a cross conveyor.

These and other objects of my invention will appear from time to time as the following specification proceeds and with reference to the accompanying drawings wherein.

In the embodiment of my invention illustrated in Figures 1 through 6 of the drawings a room conveyor 10 is shown as having an inclined transfer pan 11 nested therein, intermediate the ends thereof. The inclined transfer pan 11 is shown as being arranged to lift the conveying medium of the conveyor 10 and the load carried thereby and discharge the load laterally into a transversely extending transfer conveyor 12 arranged above and extending along a main gathering conveyor 13 in vertically spaced relation with respect thereto.

Figures 1, 4, 5:
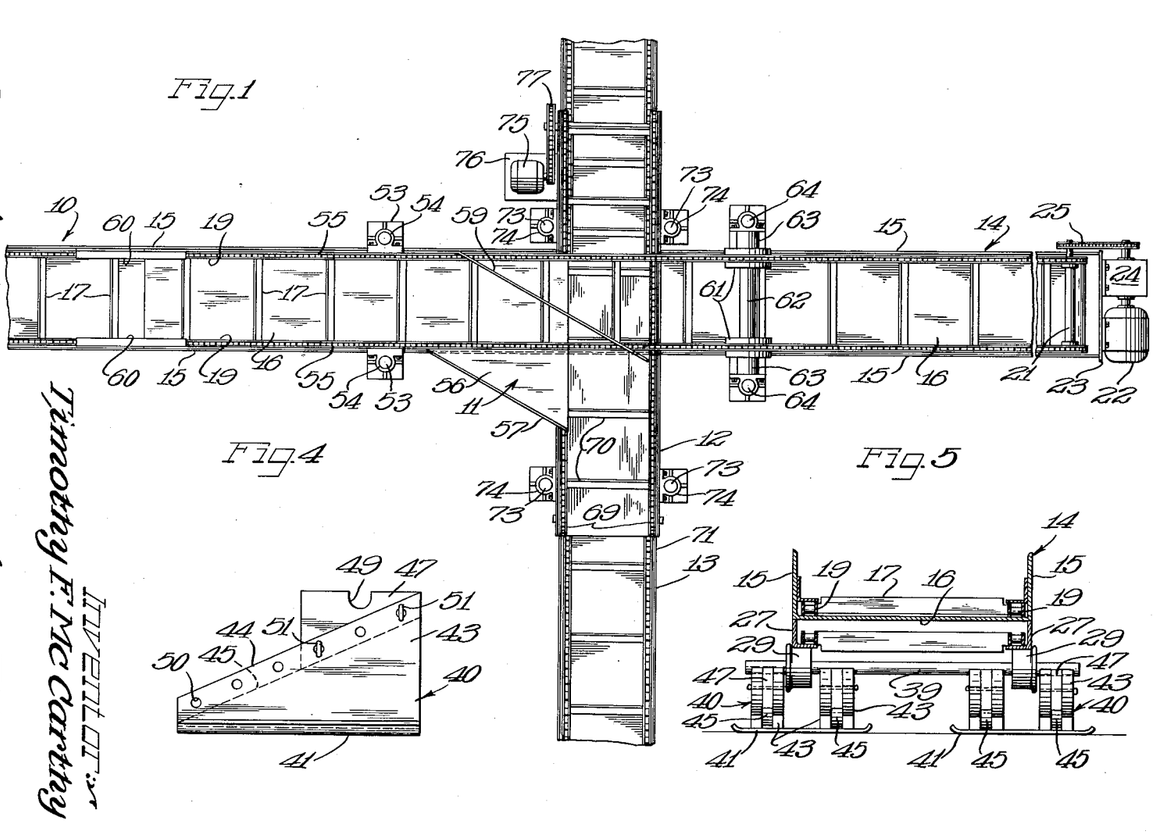
Figure 1 is a fragmentary plan view of a room and main gathering conveyor, having a transfer pan nested in the room conveyor in accordance with my invention, and illustrating one form in which my invention may be embodied.
Figure 4 is an enlarged view illustrating a detail of the standard means for the support wheels for the room conveyor.
Figure 5 is a transverse sectional view taken through the room conveyor and showing the standard and wheels supported thereby, supporting the conveyor for movement along the ground.

The room conveyor 10 may extend along a mine room up to the working face with its receiving end at the discharge end of a continuous cutting and loading machine, or a loading machine or the like, and may have the mined coal loaded directly thereon.

The main gathering conveyor 13 is herein shown as extending transversely of the room conveyor beneath the lower run thereof and as receiving the coal discharged from the transfer conveyor 12. The conveyor 13 may extend from one room to the other through the breakthroughs connecting adjacent rooms together and may discharge the gathered coal onto a main line conveyor which may extend along a room entry and convey the coal to a point where it may be transported from the mine in a usual manner.

Figure 2:
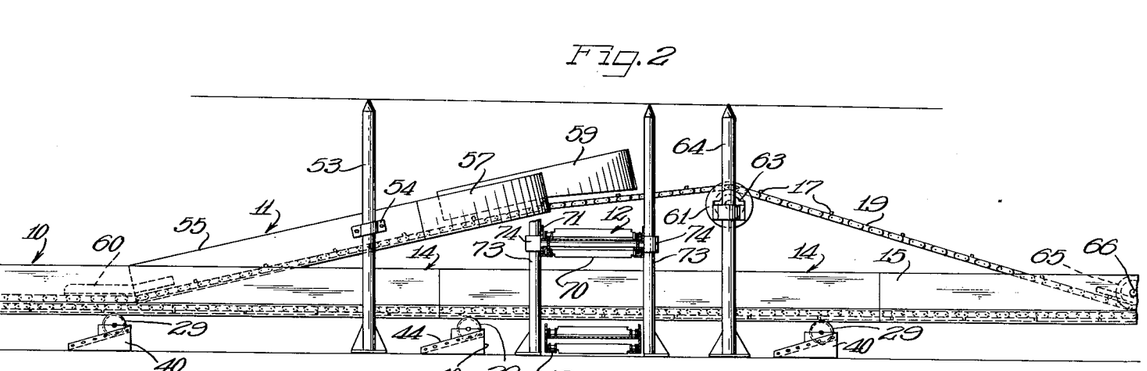
Figure 2 is an enlarged fragmentary view in side elevation of the conveyor shown in Figure 1, showing the transfer pan lifting the chain and its load out of the main trough line and transferring the load onto a transverse main gathering conveyor.

The room conveyor 10 is herein shown as being a well known form of extensible chain conveyor including a plurality of aligned conveyor pans 14—14 detachably connected in end to end relation with respect to each other and each having parallel spaced side walls 15—15 extending upwardly from opposite sides of a bottom plate 16 along which the coal is moved by parallel spaced flights 17—17 connected at their ends to laterally spaced endless chains 19—19. The endless chains 19—19 may be trained around suitable direction changing sprockets or rollers (not shown) at the inby or receiving end of the conveyor, along the top of the bottom plates of the conveyor pans 14—14 to and around direction changing sprockets (not shown) on a transverse shaft 21 at the outby end of the conveyor.

The endless chains 19—19 are herein shown as being driven by a motor 22 mounted on a base plate 23 secured to the rear ends of the side walls of the outby end pan 14. The motor 22 is shown as driving a speed reducer 24, shown as driving the transverse shaft 21 through a chain and sprocket drive 25. The base plate 23 and motor 24 preferably extend above the bottom 16 of the outby end pan 15 to clear the flanges of supporting rollers 29—29 for said pans.

Each conveyor pan 14 is shown as having angles 27—27 secured to and extending along opposite sides thereof and depending from the bottom thereof. The angles 27—27 have inwardly extending horizontal legs which form supports for the lower runs of the chains 19—19. The horizontal legs of the angles 27—27 likewise form tracks riding on flanged supporting wheels 29—29.

Figures 3, 6:
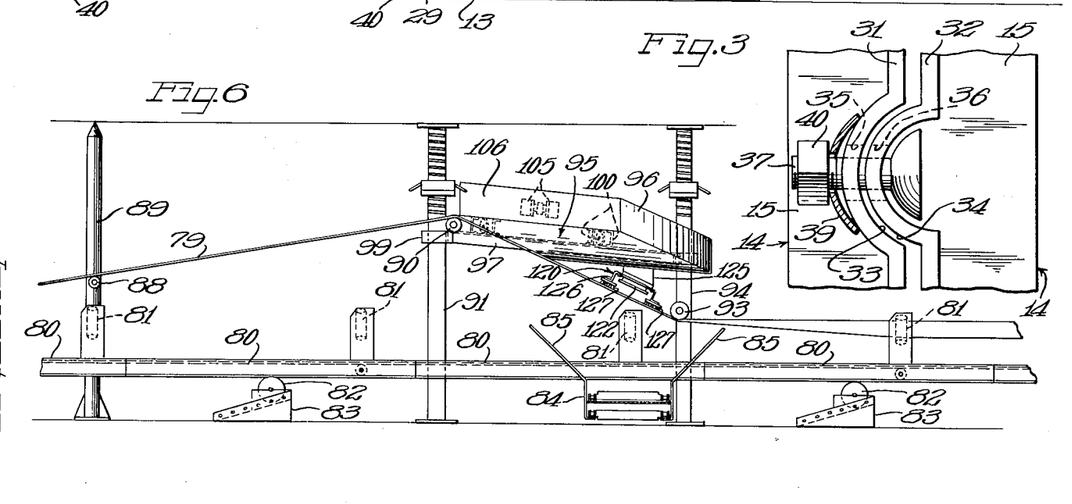
Figure 3 is an enlarged fragmentary detail view illustrating one form in which the pans of the pan line may be connected together.
Figure 6 is a fragmentary view in side elevation showing a belt type of room conveyor and illustrating the application of my invention to a belt conveyor for transferring coal therefrom onto the cross or main line conveyor.

The pans 14—14 may be connected together in any suitable manner. In Figure 3 the walls 15—15 of said pans are shown as having outwardly turned adjacent ends 31 and 32 in the general form of flanges. The outturned end flange 31 is shown as being recessed or curved inwardly along the side wall 15 of the pan 14 to form a socket 33 receiving an outwardly curved portion of the outturned end or flange 32, pressed outwardly to form in effect a ball 34 movable along the socket 33. The outturned ends 31 and 32 are spaced a sufficient distance apart to enable a limited amount of pivotal movement of the pan sections with respect to each other and permit the conveyor pan line to readily conform to an uneven mine bottom. The sockets 33 and balls 34 are shown as being apertured as indicated by reference characters 35 and 36 to receive a connecting bolt 37, the head of which is shown as being of a convex formation conforming to the inner side of the ball-shaped wall 34. The bolt is held within the apertures 35 and 36 by means of a semispherical washer 39 engaged by a nut 40 threaded on the end thereof. The pan sections 14—14 may thus readily be detachably connected together in end-to-end relation and may also readily conform to a mine bottom of an irregular contour.

The wheels 29—29 supporting the conveyor pan line, composed of the pans 14—14 connected together in end-to-end relation, are herein shown as being flanged wheels with the flanges thereof running on the outsides of the angles 27—27. Said wheels may be rotatably supported on transverse shafts 39—39 herein shown as being mounted on standards 40—40 for ready removal therefrom. The wheels 29—29, shafts 39—39 and standards 40—40 may be arranged along the conveyor at suitable intervals, which may be the distance between the ends of the pans 14—14, and form a rolling support for the conveyor pan line, enabling the entire pan line to be advanced along said wheels as the working place advances.

It should here be noted that the motor 22 and base 23, being mounted at the extreme rear end of the pan line and extending thereabove, enables the wheels 29—29 to movably support the pan line at its extreme rear end without interfering with the drive mechanism or its base.

Each standard 40 is herein shown as including a base 41 having two spaced parallel upright supports 43—43 extending upwardly therefrom. The upright supports 43—43 are herein shown as having upwardly facing inclined surfaces 44 (Figure 4) which are recessed or grooved as indicated by reference character 45. The inclined grooved surfaces 45 form a support for a correspondingly inclined bottom surface of a block 47. Each block 47 is herein shown as having a socket 49 opening to the top thereof for receiving and supporting an end of the transverse shaft 39. A plurality of apertures 50—50 are provided in each support 43 in registry with the groove 45 and extend therealong at the inclination of said walls. Said apertures are adapted to register with corresponding apertures formed in the associated block 47. Pins 51—51, registering with said apertures in said supports and blades, form a means for securing said blocks in position on said walls 43—43 at various desired elevations. Each standard 40 thus forms a support for the shaft 39 on opposite sides of a wheel 29, which may be adjusted to vary the elevation of the room conveyor 10 and to enable said room conveyor to conform to a mine bottom which may be uneven.

It should here be understood that while I have herein shown the pans 14—14 supported on wheels mounted on stationary standards, said pans may be mounted on ground engaging wheels as well, which wheels may be rubber-tired wheels, if desired.

Referring now particularly to the novel means for lifting the conveyor chains 19—19 and flights 17—17 out of the pans 14—14 for discharge onto the transfer conveyor 12, the transfer pan 11 is shown as nested within the walls of the pans 14 and as being held stationary with respect to said pan by jacks 53—53. The transfer pan 11 forms an inclined plane surface over which the chains 19—19 and the flights 17—17 travel to lift the load carried thereby over the plane of the pans 14—14. The jacks 53—53 may be interposed between the mine roof and floor and may be of a well known form commonly used in mines, either of the telescopic extensible or non-extensible type. The jacks 53—53 are shown as supporting the transfer pan 11 by means of brackets 54—54 mounted on said jacks and secured to side walls 55—55 of said transfer pan.

The side walls 55—55 of the transfer pan 11 are shown as extending along opposite sides of a bottom 56, of said pan. The bottom 56 is shown as extending upwardly in an inclined direction from the bottom plate 16 and having a widened discharge portion terminating along the inby side of the transfer conveyor 12 and extending to one side of one side wall 55 and forming a widened discharge plate arranged in cascade relation with respect to the transfer conveyor 12. One side wall 55 adjacent the widened portion of the plate 56 terminates into an angular side wall 57 extending along the outer margin of the widened portion of the bottom plate 56. The side wall 55 on the opposite side of the transfer pan 11 is shown as terminating into an angular deflecting side board 59, herein shown as extending angularly over the chains 19—19 and flights 17—17 in parallel relation with respect to the side wall 57 to the far side of the transfer conveyor 12.

Lumps and large particle sizes of coal moved upwardly along the bottom 56 of the transfer pan 11 by the flights may thus be deflected by the side board 59 to one side of the conveyor in the direction of travel of the transfer conveyor 12 for discharge onto said transfer conveyor. The fines may be carried underneath the side board 59 to fall directly onto the transfer conveyor 12.

The transfer pan 11 is also shown as having hold-down angles 60—60 at the entering end thereof, which may be suitably secured to the inside of the side walls 55—55 and extend downwardly therealong in parallel relation with respect to the bottom 16 of the associated conveyor pan 14. The angles 16—16 thus afford a means for holding the conveyor chains 19—19 to the bottom of the transfer pan 11 as they move upwardly therealong.

The chains 19—19 and flights 17—17 leaving the discharge end of the transfer pan 11 are shown as being trained over idlers 61—61. Said idlers are shown as being mounted on a transverse shaft 62 supported at its ends in bearing brackets 63—63. The bearing brackets 63—63 are shown as being clamped to jacks 64—64, interposed between the mine roof and bottom like the jacks 53—53. The chains 19—19 and flights 20—20 may then pass under an idler 65 on a transverse shaft 66, herein shown as being mounted in a pan 14 between the side walls thereof. The transverse shaft 66 may be detachably mounted in the pan in any suitable manner. It is of course obvious that hold-down angles like the hold-down angles 60—60 may be substituted for said rollers.

The transfer conveyor 12 is shown as being a flight type conveyor including a plurality of endless chains 69—69 having flights 70—70 carried thereby for progressing material along the bottom of a pan 71. The pan 71 may be mounted on its side walls on a frame structure including a plurality of upright supports or jacks 73—73 like the jacks 53—53 and 64—64 and interposed between the mine roof and the mine bottom. As herein shown, brackets 74—74 secured to and extending outwardly from the side walls of the pan 71 are provided to secure said pan to said jacks and support the transfer conveyor 12 in material receiving relation with respect to the transfer pan 11.

A motor 75 on a base plate 76, extending outwardly from the side wall of the pan 71, is shown as being provided to drive the transfer conveyor 12 through a chain and sprocket drive 77. The motor 75 may be any well known form of electric motor and may have a speed reducer incorporated in the casing thereof to reduce the speed of the motor to a speed suitable to drive the transfer conveyor 12.

The gathering conveyor 13 is shown as being beneath and in alignment with the transfer conveyor 12 and as extending beneath the pan line 14. Said main gathering conveyor may be of any well known form, but is herein shown as being a chain and flight conveyor similar to the room conveyor 10 and transfer conveyor 12. The main gathering conveyor may extend from the room conveyor 10 at right angles with respect thereto and in parallel relation with respect to the transfer conveyor 12 through the break-throughs connecting adjacent rooms together, to a room entry, for discharging material onto a main line conveyor extending therealong.

The room conveyor 10 may be from 150 to 300 feet long and may be advanced along the rollers 29—29 as the mining operation proceeds. When the room has been advanced the length of said room conveyor, the main gathering conveyor may be extended through the second breakthrough in advance of the first breakthrough, and accommodate the room conveyor 10 to advance for a distance equal to the distance between two breakthroughs. Where the breakthroughs are 105 feet apart, which is the maximum spacing under Pennsylvania mining laws, the cross conveyor would be transferred every second breakthrough or at 210 foot intervals. The transfer pan 11 may then be set in position and the room conveyor and trough sections 14—14 may then be advanced with respect to said transfer pan, as the mining operation continues.

It should here be understood that the main gathering conveyor 13 may gather material from a number of room conveyors and that the two room conveyors or plurality of room conveyors may be advanced as desired as the working places advance.

It may be seen from the foregoing that during the mining operation the room conveyor 10 may be extended along the support wheels 29—29 as the cutting and loading operation advances, while the transfer pan, transfer conveyor 12 and main gathering conveyor are in a fixed position, and this may be attained with little if any interruption in the conveying and gathering operations.

The gathering operation may thus be substantially continuous, and when the cutting and loading operation has progressed for the length of the room conveyor, a second gathering conveyor may be in position to take material from an advance end of the room gathering conveyor and the loading pan 11 and transfer conveyor 12 may be advanced to transfer material onto the gathering conveyor, and allow the advance of the room conveyor to be resumed, with a minimum of interruptions and delays in the gathering and loading operation.

Figure 7:
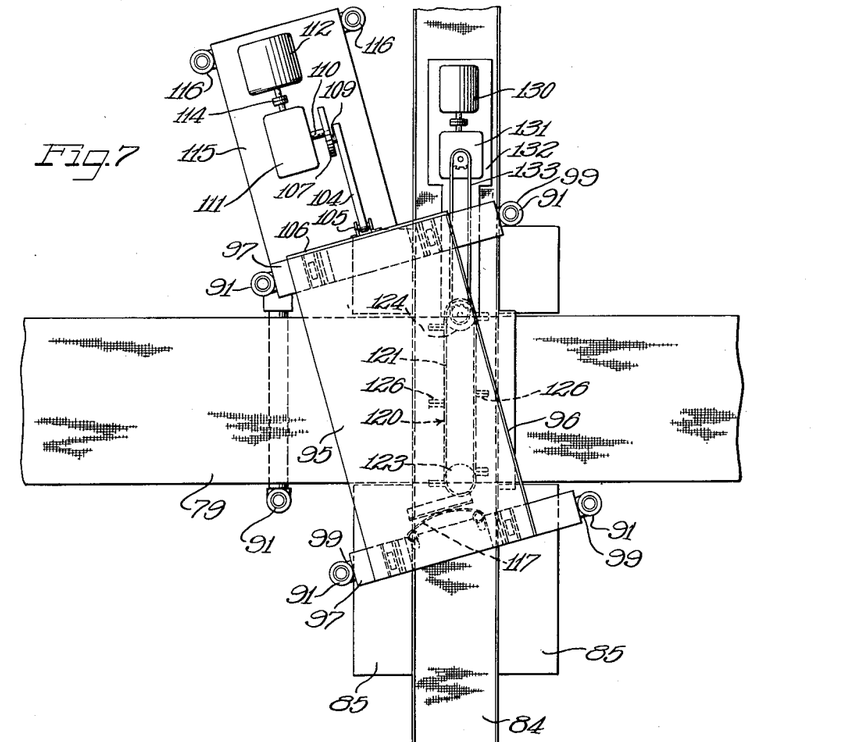
Figure 7 is an enlarged fragmentary plan view of the form of my invention illustrated in Figure 6.
Figure 8:
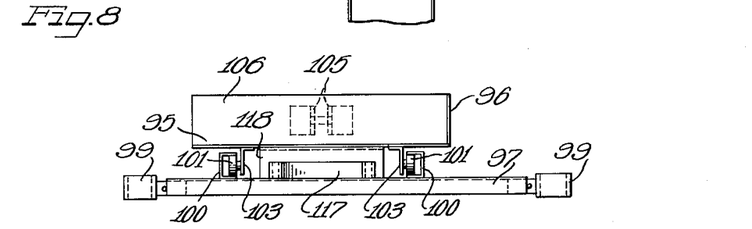
Figure 8 is a detail view showing certain details of the support for the reciprocating transfer pan.

In Figures 6, 7 and 8 I have shown the application of my invention to a standard form of extensible belt conveyor of the type commonly used in mine rooms to transport material from the working place. In this form of my invention, a plurality of frame sections 80—80 may be detachably connected together in end-to-end relation with respect to each other, as in the form of my invention illustrated in Figure 1, and may form supports for troughed idlers 81—81 supporting the upper run of the belt in the form of a trough as it moves along its conveyor frame, as is well known to those skilled in the art, so not herein shown in detail.

The frame sections 80—80 are shown as being mounted on rollers 82—82 like the rollers 29—29 and adjustably supported on standards 83—83 like the standards 40—40. The belt 79 may be drive from the outby end of the frame structure formed by the connected frame members 80—80 in a conventional manner, well known to those skilled in the art, so not herein shown or described.

A main gathering conveyor 84 is shown as extending at right angles with respect to the belt 79 beneath the lower end thereof and as having outwardly flared hopper-like sides 85—85 extending along opposite sides thereof to one side of the frame section 80—80 for receiving material discharged from the belt 79.

The main gathering conveyor 84 may be of any well known form and may either be a chain or belt conveyor, but for illustrative purposes is herein shown as being a chain and flight conveyor of well known form. The main gathering conveyor 84, like the conveyor 13, may extend from one room to the next through the breakthroughs connecting adjacent rooms together, and the room conveyor may be extended with respect to said main gathering conveyor as the mining operation progresses, as in the form of my invention illustrated in Figures 1 and 2.

The belt 79 is herein shown as being lifted above the troughed idlers 81—81, to discharge its load onto the gathering conveyor 84 by means of an idler 88, supported at its ends on jacks 89—89, which may be interposed between the mine roof and the mine floor. It should here be understood that while only one idler 88 is shown in Figure 6, and that idler is shown as being a flat idler, any number of idlers may be provided to provide the required support for the belt 79 and its load as it travels upwardly to a transfer station, and troughed idlers may be substituted for flat idlers up to the discharge station if desired.

At the peak of upward travel of the belt 79 is an idler 90 suitably supported at its opposite ends on roof jacks 91—91. The roof jacks 91—91 may be of any well known form but are herein shown as being screw types of jacks interposed between the mine floor and the mine roof. The idler 90 has a flat face to provide a flat discharge surface for the belt. From the idler roller 90 the belt is inclined downwardly at a relatively sharp break over said idler and is trained under an idler 93, suitably supported at its opposite ends on roof jacks 94—94. The jacks 94—94, like the jacks 91—91, are shown as being screw jacks interposed between the mine roof and mine bottom. From the idler 93 the belt extends to the outby end of the conveyor and is supported on the spaced trough idlers 81—81 as it extends therealong.

The means for transferring coal from the belt 79 onto the main gathering conveyor 84 is herein shown as comprising a reciprocably driven transfer pan 95 extending across the belt in advance of the idler roller 90 and inclined transversely with respect to the belt toward the discharge side thereof and the hopper 85. The loading pan 95 is shown as being of a rectangular form in plan with a retaining wall 96 extending along the side thereof opposite from its advance edge. The advance edge of the pan 95 is disposed closely adjacent the top of the belt, just in advance of the peak of the belt, as it rounds the idler 90, to pick up the coal from the belt and move it onto the gathering conveyor 84, as will hereinafter more clearly appear as this specification proceeds.

The jacks 91—91 and 94—94 are herein shown as being positioned in alignment with the plane of inclination of the loading edge of the reciprocating pan 95. Frame structures 97—97 are shown as extending across the main gathering conveyor 84 and as being secured at their ends to the jacks 91 and 92 as by brackets 99—99. As shown in Figure 6, the frame structures 97—97 are downwardly opening channels, inclined with respect to the horizontal and support the transfer pan 95 with respect to the horizontal at an angle inclined downwardly toward the hopper 85. Each frame structure 97 is shown as having a pair of laterally spaced inwardly facing channels 100—100 mounted thereon and extending therealong in parallel relation with respect to the advance or loading edge of the pan 95, and forming guide tracks for support rollers 101—101 for said loading pan. The support rollers 101—101 are shown as being mounted on and extending outwardly from the horizontal legs of angles 103—103 depending from the bottom of the loading pan 95.

The means for reciprocably driving the loading pan 95 across the inclined top surface of the belt 79 is herein shown as comprising a link or pull rod 104, connected between the vertical legs of angles 105—105, secured to a rear wall 106 of said pan and extending rearwardly therefrom. The opposite end of the pull rod 104 is shown as being pivotally mounted on a crank 107, on a crank pin 109, projecting outwardly from said crank. The crank 107 may be mounted on a shaft 110 extending within a casing 111, which may have a speed reducer (not shown) mounted therein and which may be driven through a motor 112 through a coupling 114. The motor 112 and casing 111 may be mounted on a base plate 115 connected with one frame structure 97 at its end adjacent the belt 70, and supported above the ground on jacks 116—116 at its opposite end. The motor 112 and shaft 110 are so arranged as to reciprocably drive the loading pan 95 at a relatively high rate of speed with a short stroke against a leaf spring 117, secured at its ends to the beam or frame structure 97 extending over the hopper 85, and bowed inwardly therefrom. The leaf spring 117 is shown as having engagement with an abutment member 118 depending from the bottom of the loading pan 95 and extending transversely thereof. The spring 117 is of such a strength and is so mounted on the beam 97 that its resistance in compression builds up a counterforce that tends to return the loading pan 95 in a return direction at a much higher speed than the forward stroke thereof, so as to assure a movement of the coal downwardly along the pan 95 onto the hopper 85.

As the loading pan 95 is inclined toward the retaining wall 96, the loading edge of said loading pan 95 will pick the coal directly from the top of the belt 79, and convey it both toward the retaining wall 96, as well as discharge end of the loading pan to one side of said belt, for discharge onto the hopper 85 and main gathering conveyor 84. The inclination of the loading pan 95 thus increases its capacity to pick up the coal and carry it away from the belt.

Positioned directly beneath the loading pan 95 is a belt cleaner 120. Said belt cleaner is herein shown as comprising an endless chain or belt 121 supported and guided for movement about a guide bar 122 extending in a plane parallel to the plane of the belt 79. A direction-changing roller or sprocket 123 may be journaled at the end of said bar adjacent the hopper 84. The drive sprocket 124 may be journaled at the opposite end of said bar. The guide bar 122 may be suitably supported on the frame structures 97—97 as by brackets 125—125. Attachments 126 may be secured to and extend outwardly from certain links of the chain and depend therefrom in a plane perpendicular to the plane of inclination of the belt 79. The attachments 125—125 may have brushes 127—127 on their lower ends, moving over the top surface of the belt, to clean slack, coal and dust therefrom and discharge this coal onto the main gathering conveyor 84. The brushes 127—127 may be bristle or rubber brushes, and if desired both bristle and rubber type may be used and alternately arranged along the chain 121 to wipe and clean off any fine coal on the main conveyor belt that may pass under the unloading edge of the unloading pan. The sprocket 124 is shown as being driven from a motor 130 and speed reducer 131 mounted on a frame 132 which may be suitably secured to the bar 122 and supported on the adjacent frame structure 97. The sprocket 124 may be driven from the speed reducer 131 through a chain and sprocket drive 133.

While the frame structure 132 is herein shown as being supported on the frame structure 97, it need not be so supported, but may be supported on a separate structure resting on the ground or on suitable roof jacks like the jacks 91 and 94.

In this form of my invention the unloading pan 95 and cross gathering conveyor 84 may be in one position in the mine room and the main belt conveyor may be advanced as the mining operation advances along the wheels 82—82 as in the form of my invention illustrated in Figures 1 and 2, and the advance of the belt may be attained with little if any interruption in the operation of taking coal away from the combined mining and loading machine.

Figures 9, 10, 11:
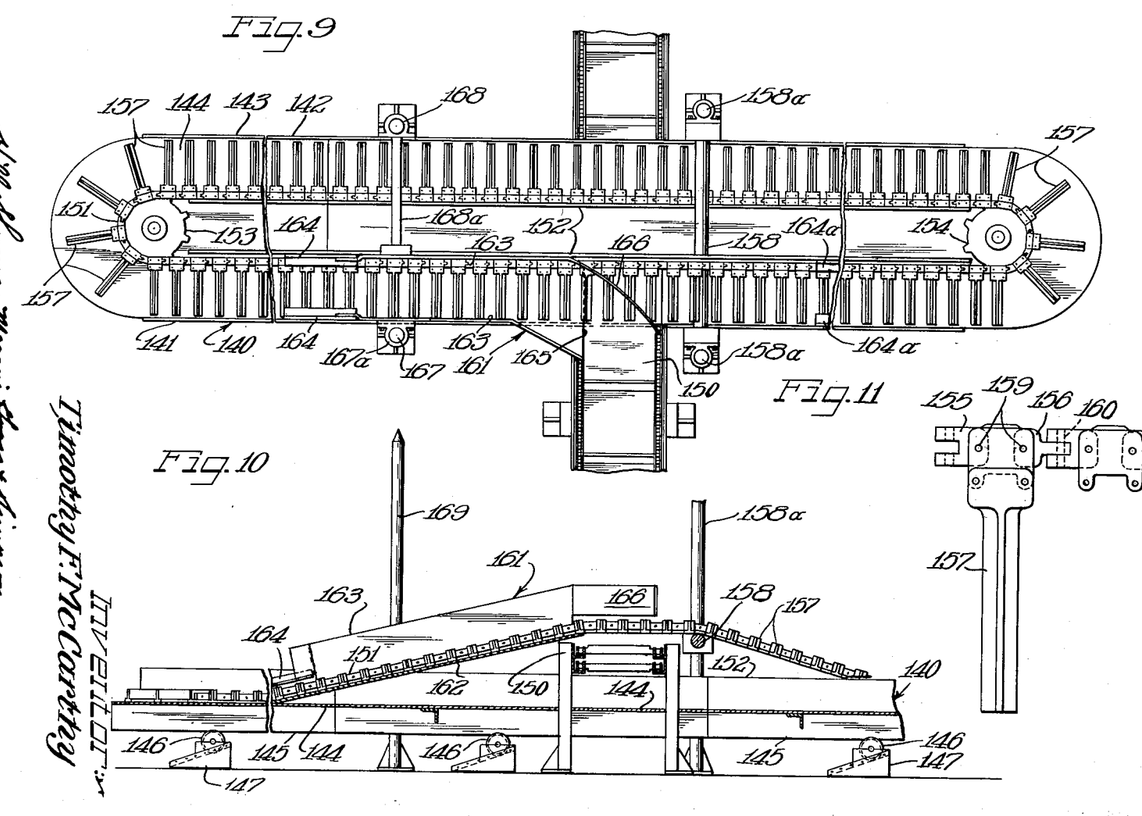
Figure 9 is a plan view illustrating still another form in which my invention may be embodied and showing my invention applied to an offset flight type of conveyor wherein the outgoing run of the conveyor may be used to transport coal away from the working place and the incoming run may be utilized to carry supplies and props back to the working place.
Figure 10 is an enlarged fragmentary view in side elevation with certain parts shown in longitudinal section and illustrating certain details of the transfer pan for lifting the chain and its load out of the main conveyor pan line.
Figure 11 is a detail view, illustrating certain details of the conveyor chain utilized in this form of my invention.

In Figures 9 and 10 and 11 I have shown my invention as applied to an offset flight type of conveyor in which the load carrying run of the conveyor may carry coal away from the working face and the return run of the conveyor may be used to move supplies and props up to the working face. In this form of my invention I have shown a sectional conveyor pan line 140 having upright side walls 141 and 142 extending along the outer edges of pan sections 143—143 of the conveyor. The pan sections 143—143 are each shown as having a bottom plate 144 from which the side walls 141—142 extend. Said pan sections may be detachably connected together by suitable connecting means, such as the connecting means shown in Figure 3.

Angles 145—145 are shown as depending from the bottoms of the trough sections 143—143 and as being supported at their ends on flanged wheels 146—146 mounted on standards 147—147. The rollers 146—146 and standards 147—147 are like the rollers 29—29 and standards 40—40 and afford a means for advancing the pan line 140 with respect to a main room conveyor 150 with a minimum of interruption in the conveying operation.

As shown in Figure 9, the offset flight conveyor includes an endless chain 151, guided along inwardly spaced upright walls 152—152 extending upwardly from the pan sections 143—143. The chain 151 is trained about a sprocket 153 at the inby end of the pan line 140 and about a drive sprocket 154 at the outby end of said pan line. The sprockets 153 and 154 are both shown as being journaled for rotation about vertical axes. The sprocket 154 may be driven by a suitable drive mechanism, such as a motor and speed reducer (not shown), which may be mounted on the bottom of the pan line between the material carrying and return runs of the endless chain 151, and not herein shown or described since it forms no part of my present invention. The endless chain 151 is shown in Figure 11 as including links 155 and 156 pivotally connected to opposite sides of flights 157—157. The links 155 and 156 are shown as being male and female links, respectively, and have interengagement with each other and are pivotally connected to the flights 157—157 by pivotal pins 159—159 and are connected together by pivotal pins 160—160, perpendicular to the pivotal pins 159—159.

The chain 151 may thus pivot in both horizontal and vertical planes and may travel upwardly along the inclined ramp of a loading pan 161. The loading pan 161 is shown as being nested within the adjacent walls 141 and 152 of the pan line 140 and arranged to remain stationary while the pan line is advanced with respect to said stationary loading pan, as the mining operation progresses without interruption of the conveying operation, as in the forms of my invention illustrated in Figures 1 through 8.

The loading pan 161 may be like that shown in Figures 1 and 3 and is herein shown as having an inclined bottom plate 162 inclined upwardly from the bottom of the pan line 140 and having side walls 163—163 nested within the side walls 141 and 152 of the pan line 140. Hold down angles 164—164 are shown as being secured to the advance ends of the side walls 163—163 and extending in advance thereof parallel to the bottom plate 162 and turning to extend horizontally beyond the bottom plate 162 and engaging the chain 151 and outer ends of the flights 157—157, to hold said chain and flights to the bottom of the loading pan 161 as they move upwardly therealong.

The bottom 162 of the loading pan 161 is shown in Figure 10 as having a widened discharge edge as indicated by reference character 165, which extends along the advance edge of the conveyor 150 in cascade relation with respect thereto.

At the far side of the conveyor 150 is a roller 158, rotatably supported at its ends on jacks 158a—158a and supporting the chain 151 and flights 157—157 beyond the loading pan 161 as they are inclined downwardly to the bottom 144 of the conveyor 140. Detachable hold-down angles 164a—164a may be detachably mounted on the side walls 141 and 152, to guide said chain and flights to the conveyor 140.

A side board 166 is shown extending from the inner side wall 163 of the loading pan 161 angularly over the conveying chain and flights toward the far side of the main gathering conveyor 150 to deflect the large lumps of coal beyond the side of the loading pan 160 onto the conveyor 150 in the direction of travel thereof while the fines and slack may drop directly onto said gathering conveyor.

The loading pan 161 is shown as being held in position between the side walls of the pan sections of the pan line 140 by roof jacks 167 and 168. The jack 167 is shown as being secured to the outer side wall 163 of the loading pan 161 as by a bracket 167a. The jack 168 is shown as being positioned on the opposite side of the conveyor from the jack 167 and as having supporting connection with the inner side wall 163 of the loading pan 161 as by an out board support bracket 168a.

It may be seen from the foregoing that in this form of my invention, like the form of my invention illustrated in Figures 1 to 8, inclusive, the entire room conveyor may be extended with respect to the main gathering conveyor as the mining operation progresses, while the loading pan 161 remains in position during advance of the room conveyor with respect thereto.

In the modification of my invention illustrated in Figures 12 through 16, I have shown my invention applied to a single center strand chain type of conveyor, and have deflected the return run of the conveyor to travel beside the material carrying run thereof, for use in carrying supplies up to the working place. A center strand chain 169 having flights 170—170 extending laterally therefrom is shown as moving along a sectional conveyor pan line like the sectional pan line in the form of conveyor shown in Figure 1. The pan line may include a plurality of intermediate pan sections 171—171 and end pan sections 172—172 detachably connected together in a suitable manner such as is illustrated in Figure 3 of the drawings. The pan sections 171—171 are shown as having a bottom 173 and side walls 174—174 extending upwardly from opposite sides thereof and as having tracks or angles 175—175 depending from the bottom thereof and supported on flanged wheels 176—176 supported on standards 177—177 like the wheels 29—29 and standards 40—40. Since the return run of the chain is positioned to one side of the load carrying run thereof, the intermediate pan sections 171—171, instead of having the return run of the chain moving therebeneath as is customary, are shown as having pan sections 179—179 secured thereto and extending laterally therefrom for the return run of the conveyor and also supported on the wheels 176—176 so the entire conveyor may be advanced as a unit.

Figure 12:
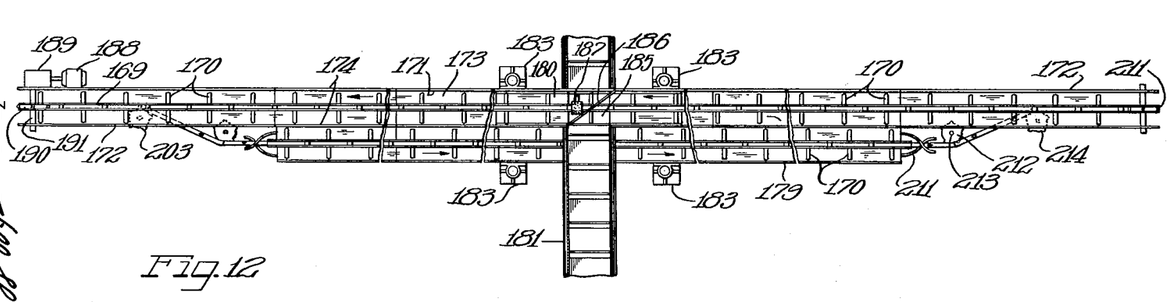
Figure 12 is a fragmentary plan view showing still another form in which my invention may be embodied and illustrating the use of a center strand chain as a conveying medium and showing the application of my invention to another form of conveyor wherein the incoming and outgoing runs of the conveyor may be utilized to transport material.
Figure 13:
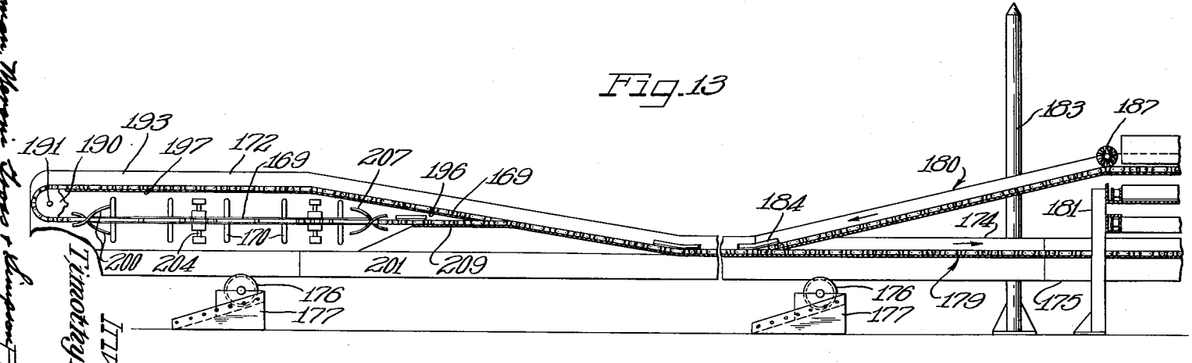
Figure 13 is an enlarged fragmentary view in side elevation of the conveyor shown in Figure 12.

An inclined loading pan 180 is shown as being nested within the intermediate pan sections 171—171 and extending upwardly over a main gathering conveyor 181 and in an inclined direction and then horizontally thereacross and downwardly beyond the far side thereof onto the pan line. The loading pan 180, like the loading pans in the form of my invention previously described, may be held in position by roof jacks 183—183 which may be interposed between the mine roof and the mine floor and may also have hold-down angles 184—184 at the entering and discharge ends of said loading pan 180 to hold the conveyor to the slope of said loading pan as it leaves the pan line 170 and is lifted by the loading pan 180 to discharge its load onto the main gathering conveyor 181 and as it again returns to the plane of the pan line. The loading pan 180 is shown as being open at its bottom above the main gathering conveyor 181, as indicated by reference character 185, and as having a deflecting side board 186 extending angularly thereacross over the chain 169 for deflecting lump coal onto said main gathering conveyor. A brush 187, which either may be a stationary or rotating brush, is shown as being mounted between the side walls of the loading pan 180 at the far side of the opening 185 to brush the fine coal carried over by the conveyor chain 169 from said chain onto the gathering conveyor 181.

The conveyor chain 169 is shown as being driven at the outby end of the conveyor by means of a motor 188, a speed reducer 189 driving a sprocket 190 on a transverse shaft 191. The motor 188 and speed reducer 199 are shown as being mounted on a side wall 193 of the outby end pan 172 of the pan line 170.

The end pan 172 at the drive end of the conveyor pan line is shown as having an inclined bottom plate 196 along which the conveyor chain travels, which terminates into a horizontal plate 197 leading to the sprocket 190 for guiding the conveyor chain 179 and its flights thereto. The end pan 172 at the opposite end of the conveyor trough line is like the end pan at the drive end of the pan line, but does not have the drive mechanism for the conveyor secured thereto.

Figure 16:
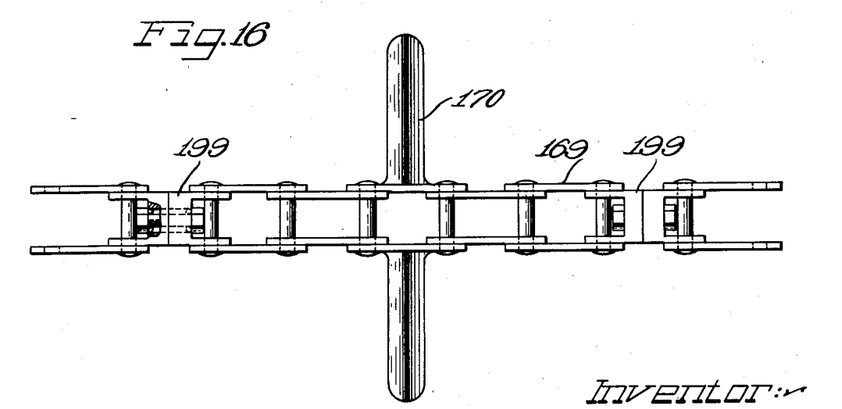
Figure 16 is an enlarged detail view showing the form of center strand conveyor chain used.

The conveyor chain 169 is shown in Figure 16 as being of a universal type having swivel links 199 connected therein, intermediate the flights 170—170, to accommodate said flights and the links and flights attached thereto to swivel from a horizontal to a vertical plane, and thus to accommodate the entire lower run of the chain to be shifted laterally onto the return pans 179—179.

The bottom 197 of the end pan 172 is thus elevated from the bottom of the pan line a distance sufficient to accommodate the vertically extending flights therebeneath when switching the return run of a conveyor to travel beside the load carrying run thereof.

Figure 14:
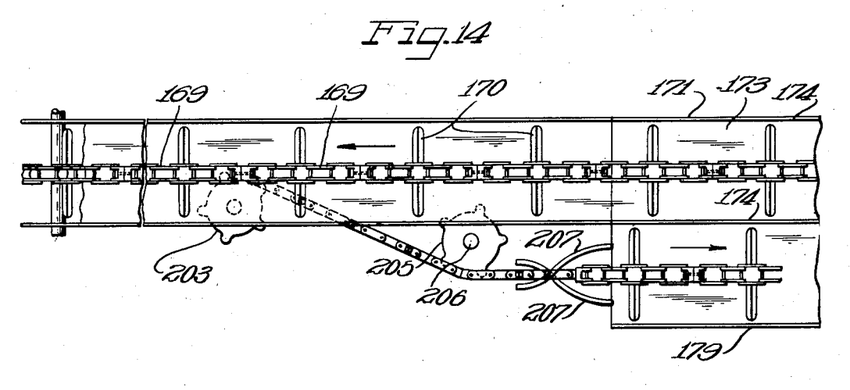
Figure 14 is an enlarged detail plan view, showing certain details of the switching means for the conveyor chain, for switching the return run of the chain to travel alongside the load carrying run thereof.
Figure 15:
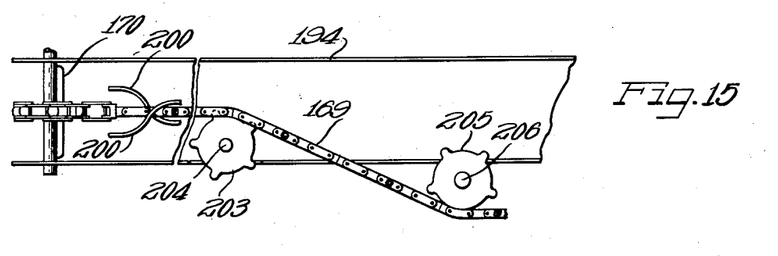
Figure 15 is a detail plan view showing the lower run of a chain and certain other details of the switching means shown in Figure 14.

The means for swiveling the flights to extend vertically so they may be shifted laterally to the pan 179 is herein shown as comprising two cam bars 200—200 (Figures 13 and 15). The cam bars 200—200 are shown as being of a modified generally S-shaped spiral in plan and side elevation. One spirals from beneath the bottom of the chain to above the top of the chain and also extends transversely thereacross from one side thereof to the other. The other spirals from above the top of the chain to beneath the bottom thereof and extends transversely thereacross from one side thereof to the other. As the cam bars 200—200 engage the upper and lower sides of the flights 168—168 on opposite sides of the center thereof, they will thus pivot the flights 170—170 from a horizontal to a vertical position and will also position the links of the chain to engage the teeth of a sprocket 203, the pitch line of which is shown as being substantially in alignment with the longitudinal center of the end trough 172. From the sprocket 203 the chain is trained angularly outwardly around a sprocket 205 on a vertical shaft 206, offset from the side wall of the end trough, a distance sufficient to place the pitch line of the sprocket teeth substantially in alignment with the longitudinal center of the pan section 179. At the entering end of the return pan section 179 are two cam bars 207—207 like the cam bars 200—200. The cam bars 207—207 engage opposite sides of the flights 168—168 as they pass therebetween and turn said flights and the chain 169 from a vertical to a horizontal position to travel along the return pan sections 179—179 and move material, such as supplies, therealong to the working place when required. The end pans of the return pan sections 179 have a generally horizontal entering end 209 which slopes downwardly to the plane of the pan sections 171—171 to lower the chain to the plane of travel of the load carrying run of the conveyor between the end pan sections and the transfer pan 180.

At the inby end of the return run of the conveyor are mounted two spiral cam bars 211—211, like the cam bars 200—200, which swivel the chain and flights vertically to travel about a sprocket 212 rotatable about a vertical shaft 213 and inwardly therefrom in alignment with the longitudinal center line of the pan line 170 about a horizontally disposed sprocket 214. Cam bars (not shown) similar to the cam bars 200—200 are provided at the discharge end of the sprockets 214, to again switch the chain 169 and flights 170 to travel in a horizontal plane and be trained about an end idler sprocket 215 at the inby end of the pan line, and travel therealong to the outby end thereof.

It should here be understood that the showing of the various conveyors and structures are illustrative only, and that various conveyor structures may be provided to carry out my invention.

It should further be understood that the cam bars shown in Figures 11 through 15 may be mounted on the pan sections of the pan line in any suitable manner and that the idler switching sprockets 203, 205, 212 and 214 may also be suitably supported and journaled on the pan sections of the pan line in any well known manner, which need not here be shown or described, since it is no part of my invention.

It may be seen from the foregoing that a new and improved conveyor system and structure, particularly adapted for use in mines underground, has been provided which is adaptable to various form of conventional conveyors in use today wherein a transfer pan, which may be stationary during extension of the conveyor, lifts the conveying medium and its load from the conveyor pan line and transfers the load to a cross gathering conveyor.

It may further be seen that with the arrangement just described the room conveyor may be advanced as the mining operation advances without interruption in the conveying operation or the transfer of material to the gathering conveyor, thus assuring the continuous transportation of coal from the working place and avoiding the delays heretofore present in continuous cutting and loading operations during extension of the conveyor and thus greatly increasing the use factor of the machine, as well as the efficiency thereof.

It may still further be seen that a conveying system and mechanism of a novel and improved form and arrangement has been provided in which the return run of the conveyor may be effectively used to bring supplies, such as timbers and props, up to the working place as the load carrying run of the conveyor transports the coal away from the working place.

It will be understood that modifications and variations may be effected without departing from the scope of the novel concepts of the present invention.

I claim as my invention:

1. In a material transportation system for mines underground, a room conveyor comprising a pan line having a conveying medium movable therealong, a plurality of spaced wheels supporting said pan line for advancing movement along a mine room, a main gathering conveyor extending transversely of said room conveyor and held from movement during advancing movement of said room conveyor, and means accommodating said room conveyor for advancing movement with respect to said main gathering conveyor and lifting said conveying medium and its load out of said pan line for discharge onto said main gathering conveyor comprising an inclined transfer pan nested within said pan line and extending over the top of said main gathering conveyor and having an open bottom in registry therewith, and means supporting and holding said inclined transfer pan from movement with respect to said main gathering conveyor.

2. In a material transportation system for mines underground, a room conveyor comprising a pan line having a conveying medium movable therealong, a plurality of spaced wheels supporting said pan line for advancing movement along a mine room, a main gathering conveyor extending transversely of said room conveyor and held from movement during advancing movement of said room conveyor, means accommodating said room conveyor for advancing movement with respect to said main gathering conveyor and lifting said conveying medium and its load out of said pan for discharge onto said main gathering conveyor comprising an inclined transfer pan nested within said pan line and extending over the top of said main gathering conveyor and having an open bottom in registry therewith, means supporting and holding said inclined transfer pan from movement with respect to said main gathering conveyor, and a deflecting side board extending angularly across said transfer pan and said main gathering conveyor for deflecting the lumps to one side of said transfer pan onto said main gathering conveyor in the direction of travel thereof and allowing the fines to be discharged directly onto said main gathering conveyor.

3. In an endless conveyor, a conveyor pan line, an endless chain having spaced flights carried thereby movable along said pan line, means supporting said pan line for advancing movement along the ground, a main gathering conveyor extending transversely of said pan line, an inclined transfer pan nested within said pan line, holding means for holding said transfer pan in a stationary position with respect to said conveyor pan line during advancing movement of said pan line and in position to elevate said chain and flights and the load carried thereby from said pan line, and said transfer pan terminating in material discharge relation with respect to said main gathering conveyor for discharging the load onto said main gathering conveyor.

4. In a conveyor system, a conveyor pan line, an endless chain having spaced flights carried thereby movable along said pan line, a main gathering conveyor extending transversely of said pan line beyond opposite sides thereof, means holding said main gathering conveyor in fixed relation with respect to the ground, means supporting said pan line for movement along the ground with respect to said main gathering conveyor, and means for lifting said chain and flights and the load carried thereby from said pan line in discharge relation with respect to said main gathering conveyor including an inclined transfer pan nested within said pan line and held from movement with respect thereto and terminating in cascade relation with respect to said main gathering conveyor, and a deflecting side board extending angularly across said chain and flights and gathering conveyor and deflecting the load carried by said flights in the direction of travel of said gathering conveyor.

5. In an endless conveyor system, a conveyor pan line having an endless chain having spaced flights carried thereby and movable along said pan line, spaced wheels supporting said pan line for advancing movement along the ground, a main gathering conveyor extending transversely of said pan line, and means for lifting said chain and flights and the load carried thereby from said pan line and discharging the same onto said main line conveyor comprising an inclined transfer pan having a receiving end nested within said pan line, said transfer pan being nested within said pan line to accommodate slidable advancing movement of said pan line with respect to said transfer pan, means supporting and holding said transfer pan in fixed relation with respect to the ground, said pan line terminating in material discharge relation with respect to said main gathering conveyor and having an inclined side board extending across said transfer pan and main gathering conveyor from one side to the other for deflecting the load onto said main gathering conveyor in the direction of travel thereof.

6. An endless conveyor for use in mines comprising a sectional pan line, an endless chain having spaced flights carried thereby and movable along said pan line, means supporting said pan line for advancing movement along the ground, means transferring material from said pan line in a direction transversely thereof including an inclined transfer pan nested within said pan line and accommodating said pan line for slidable movement with respect thereto, and jacks adapted to be interposed between a mine roof and floor, for holding said transfer pan in a fixed relation with respect to the ground and accommodating advancing movement of said conveyor with respect to said transfer pan without changing the discharge position of said conveyor, said transfer pan lifting said chain and flights and the load carried thereby above the plane of said pan line for discharging the load carried thereby to be carried laterally to one side thereof.

7. A mobile endless conveyor particularly adapted for use in mines comprising a sectional pan line, wheels supporting said pan line for movement along the ground, an endless chain having spaced flights carried thereby for progressing material along said pan line, and means lifting said chain and flights above the plane of said pan line for transferring the load carried thereby from said pan line including an inclined transfer pan nested within said pan line and accommodating said pan line for movement with respect thereto, jacks adapted to be interposed between a mine roof and floor for supporting and holding said transfer pan stationary, and an inclined side board extending angularly from one side of said transfer pan over said chain and flights beyond the opposite side thereof for deflecting lump material laterally for transfer and allowing the chain and flights to carry fine material beneath said side board for transfer.

8. In an endless conveyor, a conveyor pan line, an endless chain having flights for progressing material along said pan line, a plurality of longitudinally spaced support standards resting on the ground beneath said pan line, wheels rotatably mounted on said supports and forming a movable support for said pan line and accommodating said pan line for advancing movement, material transfer means for lifting said chain and flights above said pan line and discharging lump material carried thereby laterally therefrom including an inclined transfer pan, means holding said transfer pan stationary with respect to the ground, said transfer pan having a receiving end nested within said pan line and forming an inclined continuation thereof, and accommodating said pan line for advancing movement with respect thereto, and said transfer pan having a widened discharge end with an inclined side board extending therebeyond from one side thereof to the other and deflecting lump material onto the widened portion of said transfer pan for discharge laterally of said conveyor and accommodating the fines to be carried beneath said side board for discharge.

9. In a material transportation system for mines underground, a room conveyor comprising a sectional pan line having an endless chain and flight conveyor movable therealong, spaced wheels supporting said pan line for advancing movement into a mine room, a motor movable with said pan line for driving said chain and flight conveyor, a main gathering conveyor extending transversely of said room conveyor and held stationary during advancing movement of said room conveyor, material transfer means for lifting the load carrying run of said chain and flight conveyor and the load carried thereby over said gathering conveyor for discharging material thereinto and accommodating advancing movement of said room conveyor with respect to said transverse gathering conveyor comprising an inclined transfer pan having a receiving end slidably nested within said pan line and having a discharge end in material discharge relation with respect to said transverse conveyor, and jacks adapted to be interposed between the mine floor and roof for holding said transfer pan in a stationary position.

References Cited in the file of this patent

UNITED STATES PATENTS

| | | |
|---|---|---|
| 2,061,228 | Elmer | Nov. 17, 1936 |
| 2,318,872 | Madeira | May 11, 1943 |

FOREIGN PATENTS

| | | |
|---|---|---|
| 175,509 | Germany | Oct. 1, 1906 |
| 468,616 | Germany | Nov. 19, 1928 |
| 475,175 | Great Britain | Nov. 12, 1937 |
| 626,822 | Great Britain | July 21, 1949 |